United States Patent [19]

Fogelman

[11] Patent Number: 5,315,777
[45] Date of Patent: May 31, 1994

[54] HIGHWAY EMERGENCY SAFETY SIGN

[75] Inventor: John A. Fogelman, West Nyack, N.Y.

[73] Assignee: The Wise Child Inc., West Nyack, N.Y.

[21] Appl. No.: 73,283

[22] Filed: Jun. 7, 1993

Related U.S. Application Data

[63] Continuation of Ser. No. 844,722, Mar. 2, 1992, abandoned, which is a continuation-in-part of Ser. No. 693,558, Apr. 30, 1991, Pat. No. 5,263,272.

[51] Int. Cl.$^5$ ............................................. G09F 21/04
[52] U.S. Cl. ......................................... 40/591; 40/903
[58] Field of Search ............... 40/591, 617, 589, 590, 40/600, 602, 903, 539; 116/63 R, 63 T, 63 P; 16/225; 160/231.1, 231.2

[56] References Cited

U.S. PATENT DOCUMENTS

| | | | |
|---|---|---|---|
| 2,096,559 | 10/1937 | Riley | 16/225 |
| 2,166,048 | 6/1939 | Fritsch . | |
| 2,906,657 | 9/1959 | Davidson | 160/231.1 X |
| 2,933,841 | 4/1960 | Lawlor . | |
| 3,147,560 | 9/1964 | Berger et al. . | |
| 3,470,641 | 10/1969 | Meyer . | |
| 3,481,060 | 12/1969 | Hartz . | |
| 3,590,506 | 7/1971 | Jeski . | |
| 3,623,254 | 11/1971 | Parish, Sr. | 40/591 |
| 3,670,438 | 6/1972 | Carroll et al. | 40/591 X |
| 3,701,210 | 10/1972 | Smith . | |
| 3,709,237 | 1/1973 | Smith | 160/231.1 X |
| 3,742,897 | 7/1973 | Meek et al. | 40/903 X |
| 3,797,151 | 3/1974 | Dexter . | |
| 3,903,629 | 9/1975 | Gruna . | |
| 3,936,967 | 2/1976 | Davis . | |
| 3,949,503 | 4/1976 | Waress . | |
| 4,021,948 | 5/1977 | Mosch . | |
| 4,044,482 | 8/1977 | Mosch . | |
| 4,062,139 | 12/1977 | Klosel . | |
| 4,129,857 | 12/1978 | Espinosa . | |
| 4,152,854 | 5/1979 | Berry, Jr. et al. . | |
| 4,182,063 | 1/1980 | Klosel . | |
| 4,194,313 | 3/1980 | Downing | 40/610 |
| 4,607,444 | 8/1986 | Foster | 40/550 |
| 4,611,420 | 9/1986 | Delamere | 40/610 |
| 4,876,812 | 10/1989 | Haralson | 40/592 |
| 4,912,866 | 4/1990 | Bannister et al. | 40/605 |
| 5,048,451 | 9/1971 | Reimers et al. | 116/35 A |
| 5,076,196 | 12/1991 | Chan | 40/591 X |

Primary Examiner—Kenneth J. Dorner
Assistant Examiner—J. Bonifanti
Attorney, Agent, or Firm—Darby & Darby

[57] ABSTRACT

A foldable emergency sign is provided, made up of a number of flat slats joined by flexible hinges. The slats are provided with warning indicia to alert passing motorists to the presence of a disabled vehicle. The slats are also provided with magnets for quick attachment and detachment from a vehicle. A support harness may be provided for attachment to irregularly shaped areas of a vehicle. The slats may be arranged in two columns with the triangular emergency sign defined over a number of the slats in both columns or the slats may be portions of the sidearms themselves of the triangular emergency sign.

12 Claims, 7 Drawing Sheets

HIGHWAY EMERGENCY SAFETY SIGN

This is a continuation of application Ser. No. 07/844,722, filed Mar. 2, 1991 now abandoned, which is a continuation-in-part of application Ser. No. 07/693,558, filed Apr. 30, 1991 now U.S. Pat. No. 5,263,272.

FIELD OF THE INVENTION

This invention relates to warning devices for disabled vehicles on roads and highways and more specifically relates to portable safety signs that are carried in the vehicle in case of an emergency.

BACKGROUND OF THE INVENTION

It is known that vehicles have a tendency to breakdown at completely random times, often on a major thoroughfare or highway. It is also known that accidents often occur when the difference in speed between two vehicles is greatest. Of course, the worst case of this is a vehicle that becomes disabled on a highway where other vehicles are traveling at the speed limit.

Distress signs have been developed to inform passing motorists that a stranded motorist needs assistance. Examples of such devices are disclosed in U.S. Pat. No. 3,797,151 to Dexter and U.S. Pat. No. 3,623,254 to Parish, Sr. In U.S. Pat. No. 3,797,151, a magnet is utilized to mount a vertical sign to the top of a vehicle, having a legend such as "Send Help." U.S. Pat. No. 3,623,254 discloses an interchangeable sign exhibitor, where different words may be formed to convey a message from the stranded motorist.

However, these arrangements are merely message centers and do little to help avoid collisions with stationary vehicles. The U.S. Government has set guidelines for warning devices that are intended to improve the visibility of disabled vehicles. Standard 125 of the United States Department of Transportation recites the scope, application and purpose of warning devices for vehicles. Standard 125 relates to devices without self-contained energy sources that are designed to be carried in motor vehicles and used to warn approaching traffic of the presence of a stopped vehicle.

Standard 125 requires a triangle with specific size and color restrictions. A known device that conforms to Standard 125 is the free standing triangle that is usually seen behind disabled trucks. According to Standard 125, the triangle must be equilateral and from 17 to 22 inches on each side. The outermost 2 to 3 inches must be composed of two colored bands; the outer one being a red reflective material to improve night visibility and the inner band being an orange fluorescent material to improve day visibility. The color of the center section of the triangle is open, permitting the passage of wind.

However, the free-standing triangles have the disadvantages of requiring heavy mounting stands or bases, to prevent them from blowing away in the wind, and usually collapse to a size that cannot be conveniently stored in an easily accessible location in the passenger compartment of the vehicle. In general, such devices must be carried in the trunk of a car, where luggage and clutter can prevent them from being readily accessible in an emergency. They are also positioned on the ground, while they would be more easily spotted by other drivers if they were positioned nearer to driver eye level.

It is an object of my invention to provide a highway emergency safety sign. Another object of my invention is to provide a highway emergency safety sign that conforms to Standard 125, is easily portable, and can be stored in the glove compartment or side door map pocket of a motor vehicle.

It is a further object of my invention to provide a safety sign that can generally conform to the body contours of a passenger or cargo carrying motor vehicle, depending on where the sign is attached to the vehicle.

Another object of my invention is to provide a safety sign that includes means for quickly attaching/detaching the sign to a vehicle.

A still further object of my invention is to protect the sign indicia when the sign is not in use.

The foldable emergency sign of my invention comprises a plurality of flat slats joined to one another by flexible hinges. The slats carry warning indicia to alert passing motorists to the presence of the disabled vehicle. The slats are also provided with magnets for quick attachment and detachment from a vehicle. A support harness may be provided for attaching the emergency sign to the irregularly shaped areas of a vehicle.

In accordance with a further embodiment of my invention, the foldable emergency sign is in the shape of a triangle formed by three interconnected arms, each made of two or more flat slats which are joined together by flexible hinges. The arms are narrowed at the ends which define two of the apices of the triangle but not at the third apex. At that apex, the slat of one arm is positioned over the slat of the other arm and a flexible attaching mechanism, such as a flexible magnet or VELCRO tape, is positioned on the bottom of the upper slat and the top of the lower slat to join the two arms to define the third apex of the triangle when the emergency sign is to be employed. Flexible tape adjoins the slats at each arm and also adjoins each of the slats defining the other two apices of the triangle so that the triangular sign can be folded in upon itself when not in use. Flexible magnetic tape positioned on the back of each arm allows the sign to be attached to the vehicle.

The foregoing and other objects and advantages of this invention will become apparent to those skilled in the art upon reading the following detailed description in conjunction with a review of the appended drawings.

DETAILED DESCRIPTION OF THE INVENTION

Figure 1:
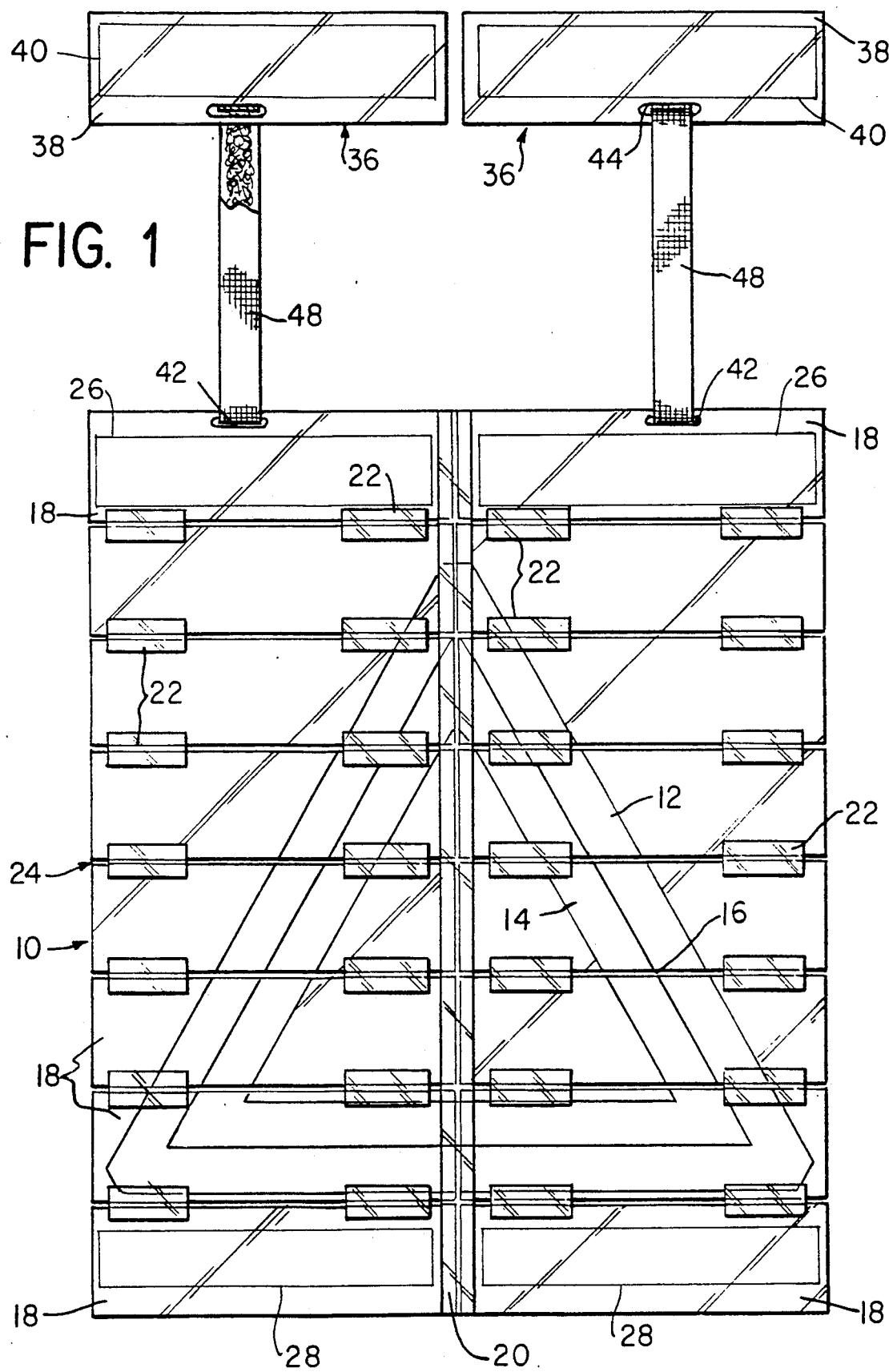
FIG. 1 is a detailed front view of an illustrative embodiment of my invention.

Turning now to the drawings, there is depicted in FIG. 1 a portable, collapsible highway sign 10 in accordance with one specific illustrative embodiment of my invention. The highway sign comprises a plurality of rectangular slats 18 arranged in two vertically aligned columns. A long flexible hinge 20 connects the two columns of slats. Short intermediate hinges 22 disposed at the upper and lower edges of each slat connect the individual slats in each column. Positioned on the outer surface of the slats, but preferably not on the surface of the uppermost and lowermost slats 18, is the visual warning indicia, conforming to the federal standards. The warning indicia, in this preferred embodiment of my invention, comprises an outer, generally equilateral triangle 12, described further below.

The safety sign of my invention may be quite large, (e.g. on the order of two feet or more in height), and therefore may have a large and readily visible warning indicia. An aspect of my invention is that the safety sign can readily be folded, first along the lengthwise hinge 20 so that the two vertically aligned columns are folded together and thereby juxtaposed with one another. The sign is then folded up and collapsed in accordion fashion on the intermediate hinges 22. The collapsed and folded sign is quite small and can readily fit into the glove compartment in a motor vehicle such as an automobile or truck.

The collapsible highway warning sign of my invention has the further advantage that it is readily and easily manufactured. Specifically, I have found that the sign may be constructed from a single 20" by 24" vinyl sheet which is approximately 0.002 inches thick. The warning indicator triangle may advantageously have sides between 17" and 22" long with one bottom side positioned horizontally. The sides of the triangle 12 may be of any suitable size but are preferably between 0.75" and 1.75" wide and made of a red reflective material. A preferred reflective material is 3M SCOTCHLITE (3M Corporation, St. Paul, Minn.) Reflective Sheeting, high intensity grade. The SCOTCHLITE material has an encapsulated lens. However, the invention is not limited to this material and any material that reflects a high level of incident light may be used in this element of the sign, e.g., a fresnel lens. However, to be useful in the invention, the reflective material must be at least partially flexible, i.e., the light reflective material cannot be completely rigid. This material may also have a pressure sensitive adhesive on the rear (non-reflective) surface. The adhesive is used to join the light reflective material to the vinyl sheet for easy application. If the light reflective material does not have an adhesive coating, then it may be joined to the vinyl substrate using any conventional adhesive designed for use with plastics. The dimensions of the outer triangle 12 leave approximately 4" borders at the top and bottom of the vinyl sheet. An inner triangle 14 is also mounted on the vinyl sheet within the triangle 12. The inner triangle has a width of between about 1.25" and 1.30". The triangle 14 is made of an orange fluorescent material, preferably 3M SCOTCHCAL/CONTROLTAC Marking Film, Yellow Orange No. 3483 (available from the 3M Corporation, St. Paul, Minn.). A pressure sensitive adhesive is present on the rear (non-reflective) surface of this material. The center section 16 of triangle 14 may be left bare or can preferably be provided with a silver color reflective material. Preferably the center section 16 employs the same material as outer triangle 12, but in silver. These different color zones can be overlapped with one another to improve the appearance and contrast of the borders. The corners of the outer triangle 12 are chamfered. Similar triangles may also be applied to the back side of the sign 10 if desired.

To fabricate this embodiment of my invention, the vinyl sheet is then cut to produce sixteen rectangular slats 18. In one preferred embodiment each slat is 3" by 10". The two triangles 12 and 14 and the center section 16 are advantageously not disposed on the top two and bottom two slats. The flexible hinges 20 and 22 allow adjacent slats 18 to be folded on top of each other, in accordance with an aspect of my invention. Slats 18 are spaced apart by approximately ⅛" by hinges 20 and 22 to provide gaps 24 for wind to pass through the sign 10 and to make the sign 10 easier to fold. The hinges 20 and 22 are made of any flexible material that has, or may be imparted with, at least one adhesive surface. The hinges are preferably made of flexible plastic, e.g. vinyl or mylar, tape. However various types of flexible cloth or plastic tape hinges that engage the side edges of adjacent slots may also be employed in my invention. The center hinge 20 extends the entire length of the sign 10. Side hinges 22 are preferably positioned both near the center and near the outer edge of the slats 18 for stability.

Affixed to the top two slats 18 of the sign construction, but on the opposite side of the triangles 12 and 14, are flexible magnetic strips 26. The strips are designed to enable the sign to be attached to a metal surface and are preferably attached with adhesive transfer tape. Similar magnet strips 28 are attached to the bottom two slats 18. The magnet strips 26 and 28 are preferably 0.125" thick by 2" wide and extend nearly the length of the respective slats 18.

A particular advantage of the sign construction of my invention is that it may be quickly folded up and collapsed into a compact bundle that can readily be stored in a small space or readily accessible location, e.g. The glove compartment of an auto. To collapse the sign 10 for storage, the two vertically aligned columns are juxtaposed by folding the columns horizontally along the center hinge 20. This folding step results in the triangles 12 and 14 being folded into face to face contact with one another. The sign 10 is then fully collapsed by folding the individual slats (which are arranged vis-a-vis in pairs after having been folded on the long axis of vertical hinge 20) on the intermediate hinges 22 in accordion fashion. In this fully collapsed position, the reflective triangles 12 and 14 face each other on the interior of the sign, and are not exposed to abrasion by other items that may be stored with the sign. The interior indicia bearing surfaces of the sign are protected from damage in this configuration. Once in this folded configuration, the sign 10 is compact enough to be stored in a pouch in a vehicle glove compartment. The sign 10 does not require storage in a trunk.

Figure 2:
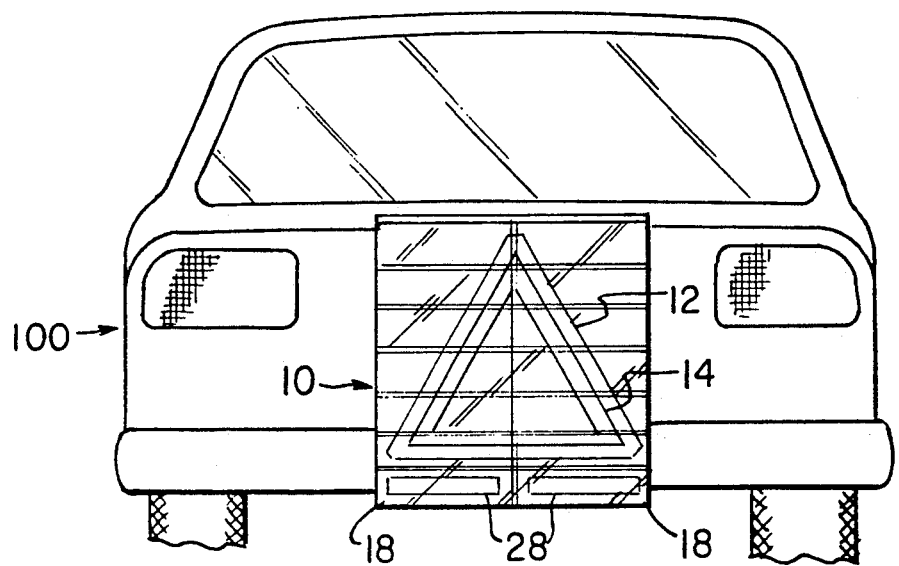
FIG. 2 is a front view of an embodiment of the invention, mounted on the rear of a vehicle.
Figure 3:
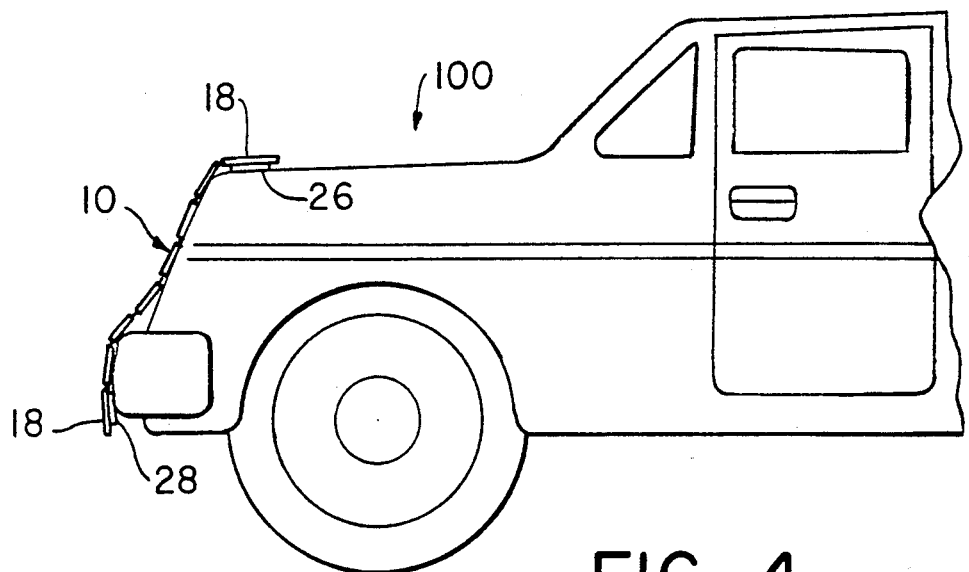
FIG. 3 is a side view of the invention mounted to the front of a vehicle.

In the unfolded position, the sign 10 can be attached to a vehicle by simply applying the top magnets 26 to any metal surface of the vehicle 100, as seen in FIGS. 2 and 3. The remainder of the sign 10 will hang down, while the bottom magnets 28 will either hang freely or preferably attach to a lower metal surface. By way of non-limiting example, the magnets 26 could be attached to the top surface of a trunk lid, while the portion of the sign 10 with the triangles 12 and 14 would hang down beside the rear of the vehicle 100, facing oncoming traffic. The unfolding, set-up and attachment of the sign 10 are accomplished without tools and with minimum time and effort.

Figure 4:
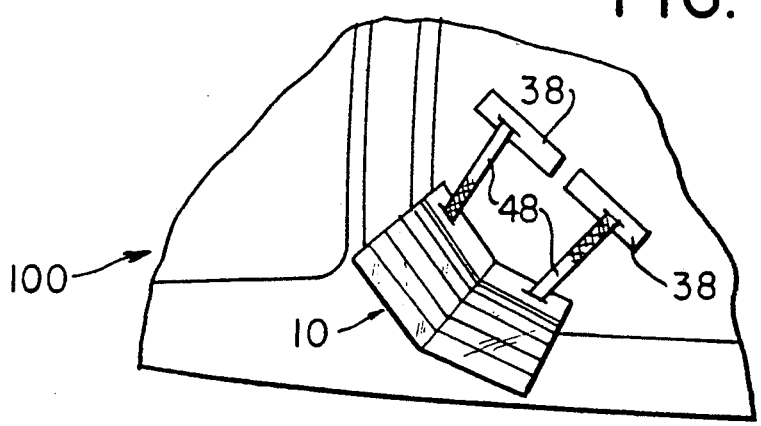
FIG. 4 is a top view of the invention mounted to a corner of a vehicle.

If it should become necessary to attach the sign to an irregular-shaped surface, as in FIG. 4, this can be accomplished using a support harness 36 also provided in accordance with another aspect of my invention. Two support slats 38, preferably having the same size and shape as slats 18, have flexible support magnets 40 attached to them with transfer tape. For attachment to the support harness 36, the two uppermost slats 18, that are positioned above the magnet strips 26, are provided with support holes 42. Attached to the support slats 38 through support holes 44 are belts 48. The belts 48 are threaded through the holes 42 and the holes 44. Hook and loop fasteners, such as those sold under the trademark VELCRO (Velcro U.S.A. Inc. Manchester, N.H.) are provided along the belts 48 to secure the belts 48 onto themselves, forming a loop connecting the sign 10 and the support harness 36.

Either with or without the support harness 36, the sign 10 can be mounted at many adjustable positions on the vehicle, allowing a stranded motorist to locate the sign 10 facing oncoming traffic and close to driver's eye level.

Figure 5:
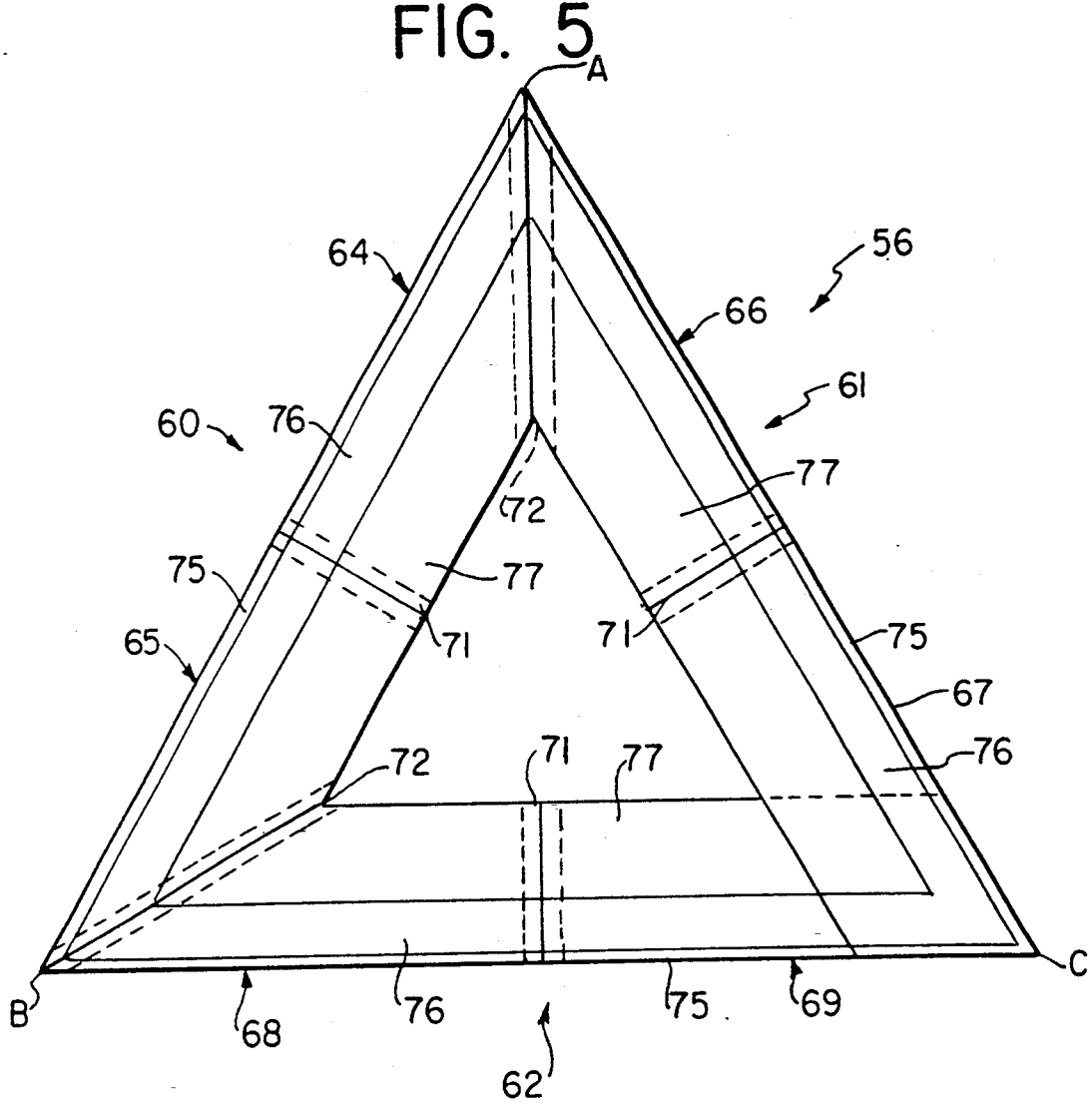
FIG. 5 is a detailed view of a second embodiment of the invention.

Turning now to FIG. 5, there is depicted another embodiment of my invention wherein the collapsible highway warning sign 56 is, itself, in the shape of the warning triangle conforming to Standard 125, that is, in the form of an equilateral triangle that is preferably approximately 20 inches on each side. Each of the arms 60, 61 and 62 of the triangle is comprised of two slats 64,65 for side 60; 66,67 for side 61; and 68,69 for side 62. Each pair of slats is joined at the middle of the side arm by a flexible plastic tape 71, such as polyester, polyethylene, vinyl, or mylar, positioned on the underside of each slat. Similarly, at apices A and B of the sign triangle another flexible tape 72 joins together the adjacent slats of the side arms 60, 61 and 62. The slats 64, 65, 66 and 68 are all truncated at the apices A and B. In contrast, slats 67 and 69, which meet at the third apex C, are not so truncated. Instead, slat 67 fits over slat 69 and the two are detachably joined together by means of an appropriate attaching material positioned on the mating surfaces of these two slats, suitable attaching materials include magnetic tape or a VELCRO tape, as identified above. Further, although not shown in FIG. 5, the undersides of arms 60, 61 and 62 each bear flexible support magnetic tape similar to the magnetic tape elements 40 of the embodiment of FIG. 1.

Colored emergency bands 75 and 76 are located on the upper surface of the arms 60, 61 and 62. The outer band 75 is formed by a red reflective tape and the inner band 76 by an orange reflective tape, as described above with reference to the embodiment of FIG. 1. Tapes 75 and 76 may have an adhesive coating affixed to one surface to enable the tapes to adhere.

Figure 6:
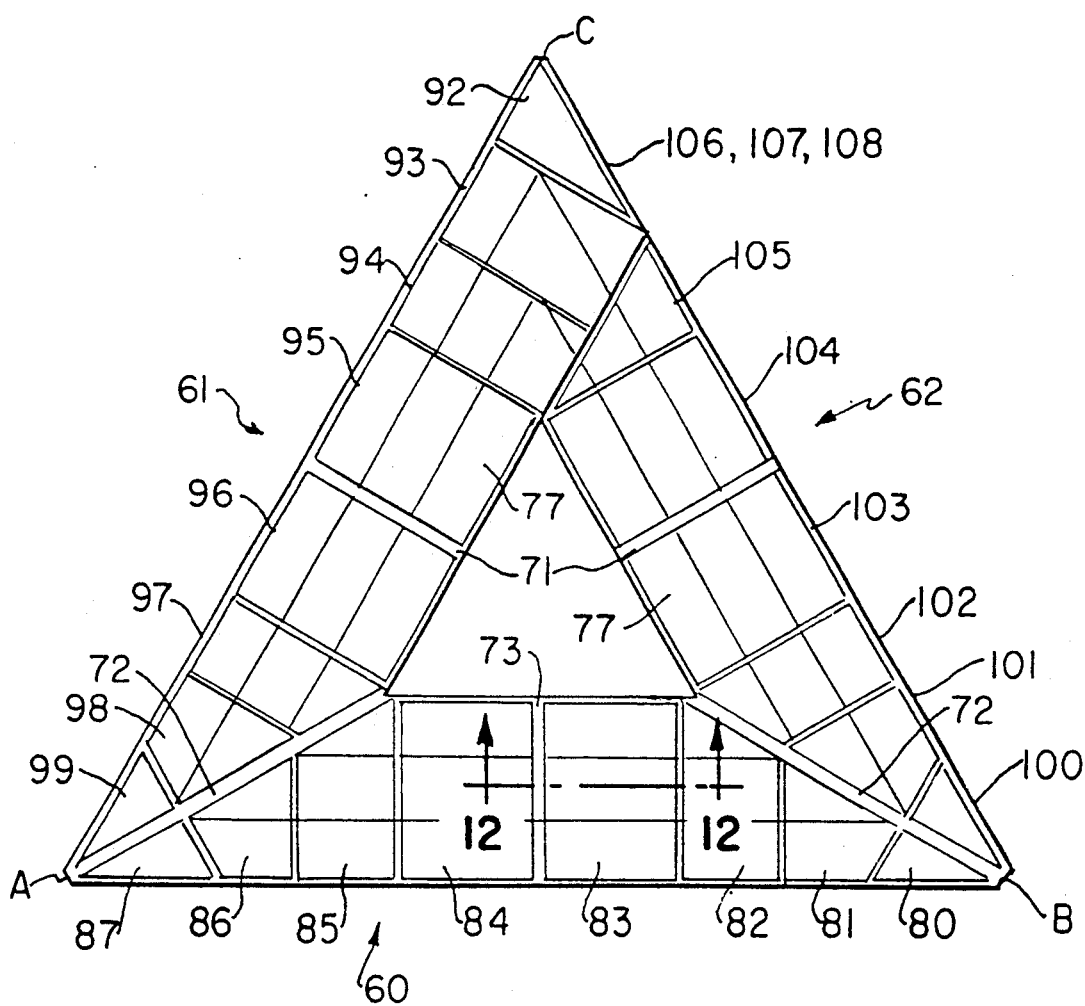
FIG. 6 is a detailed view of a third embodiment of the invention.
Figure 7:
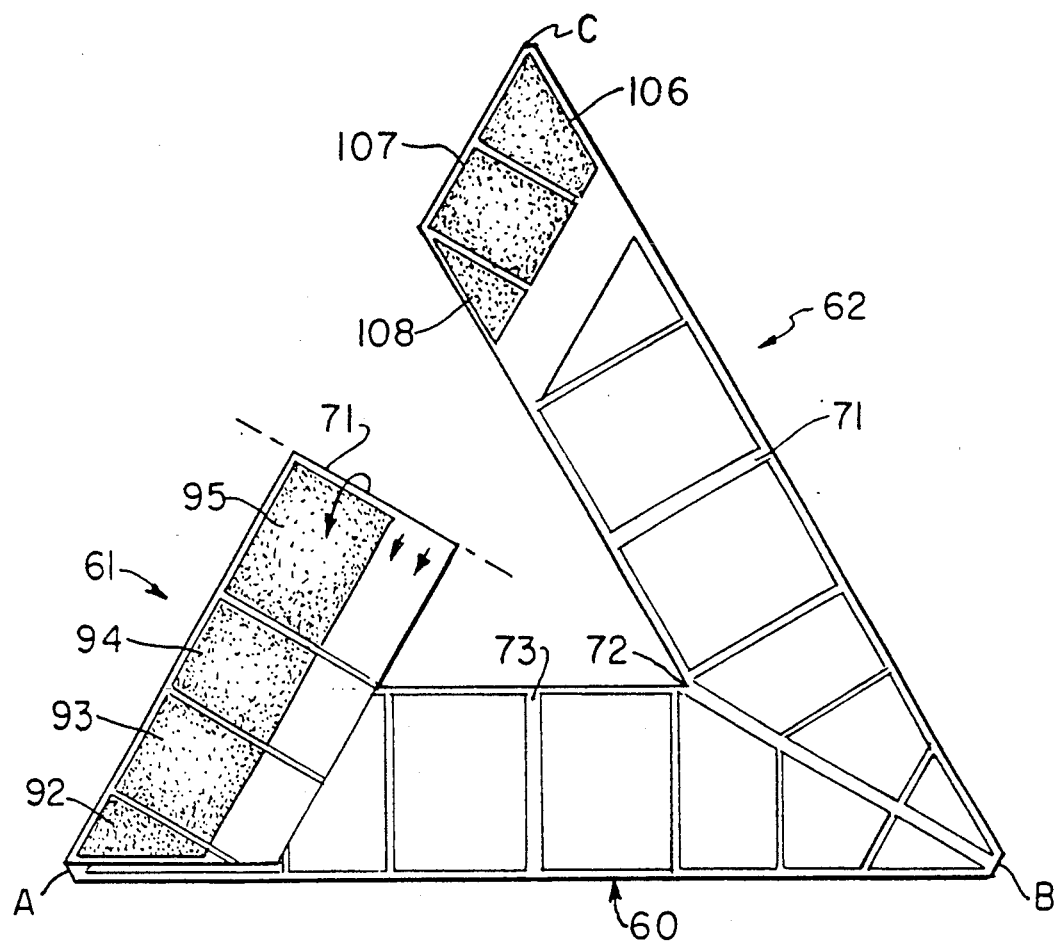
FIGS. 7-11 show the third embodiment at various stages as it is being folded into the fully collapsed form.

In normal use, the foldable emergency sign, in accordance with this embodiment of my invention, is folded upon itself along the hinges defined by the flexible tapes 71 and 72, with the slats 67 and 69 at the apex C of the triangular sign being detached from each other. In this way, the collapsed and folded up sign 56 occupies only a very small amount of space and can be retained in the glove compartment or map pocket of a vehicle. The collapsed and folded up sign can also be unfolded into its flat position and secured to the back, or, if needed, the side or front of a vehicle to serve as an emergency warning. Because the side arms of the triangle 56 are split and formed of at least two slats, the emergency triangle has a degree of flexibility when it is opened and lying flat that enables it to conform generally to the shape of that portion of the vehicle to which it is attached. In the embodiment of FIG. 5, each of the side arms 60, 61, and 62 is made of two slats. In the embodiment of FIG. 6, wherein like elements are designated by the same reference characters as in FIG. 5, the side arms are made up of more than two slats and specifically arms 60, 61 and 62, are made of eight slats. Arm 61, which fits over arm 62 at apex C has slats 92, 93 and 94 overlying slats 106, 107 and 108 of arm 62 (FIG. 7). The slats 106, 107 and 108 have similar shapes and orientation to slats 92, 93 and 94 so that they can flex together.

Further to allow these slats at the apex C to be folded together, the mating magnets, (not shown) which are positioned on the upper surface of arm 61 and on the lower surface of arm 62, are similarly made of distinct elements that are shaped to match the folding slots in the arms.

Providing the side arms 60, 61, and 62 with more than two slats, such as shown in FIG. 6, suitably joined by flexible tape, allows the sign to be more flexible when opened and flat, while still occupying the same small volume when folded. Forming the side arms of multiple slats further increases the flexibility of the sign in conforming to different vehicle body shapes.

FIGS. 7-11 show the embodiment of FIG. 6 in progressive stages of folding during operation of the folding method of the present invention. The end result of the method is a sign that is folded to a compact size only a few percent of its original size.

Arm 61 is first folded along its center hinge 71 (FIG. 7), detaching slats 92, 93 and 94 from slats 106, 107 and 108 of arm 62. Because of the overall symmetric shape of arm 61, the end of the arm at slat 92 now mates with the apex A at the connection point of arms 61 and 60. The arm 61 is preferably folded with the colored bands 75 and 76 inside the fold and the magnetic tape exposed, which serves to protect the bands during storage. Arm 62 is then folded similarly along its center hinge 71 (FIG. 8).

Figure 8:
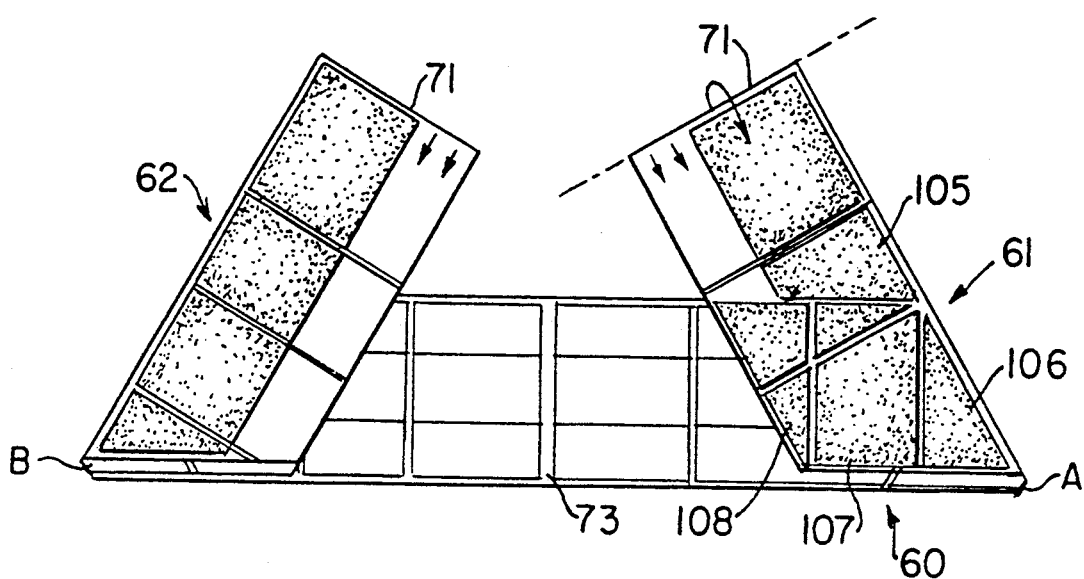
Figure 9:
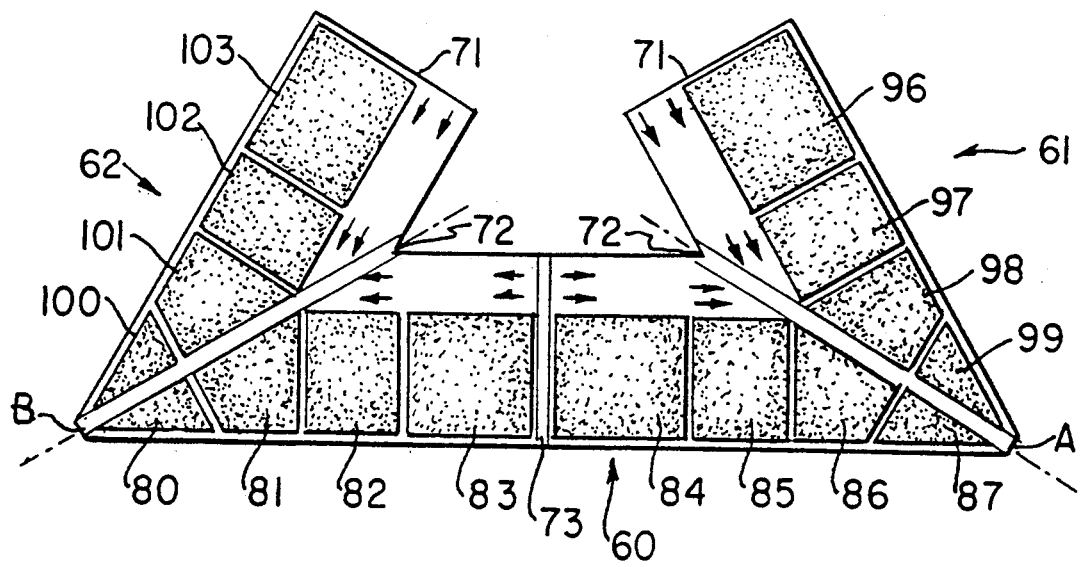
Figure 10:
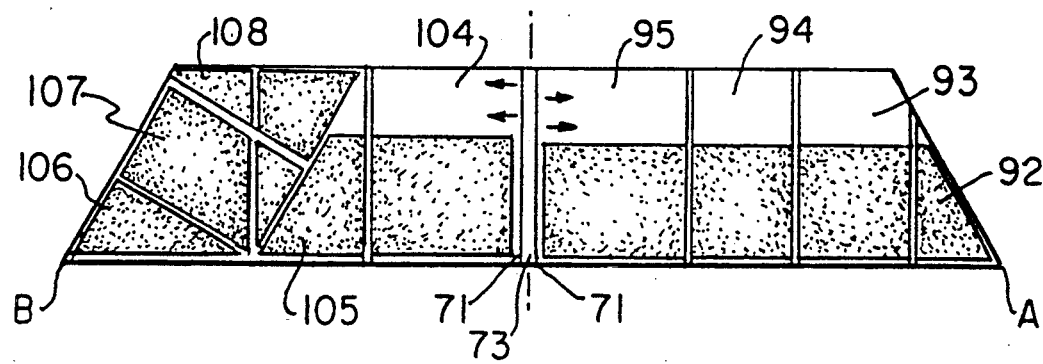
Figure 11:
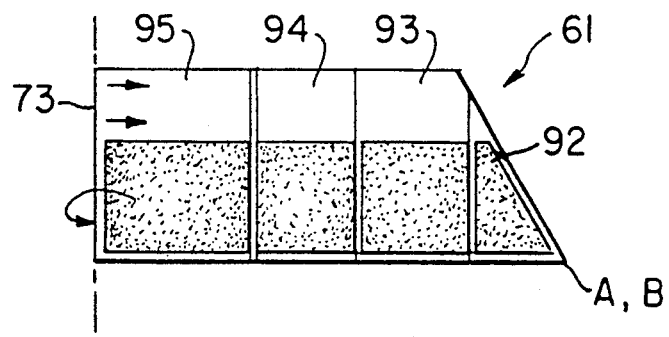

FIGS. 9-11 are viewed toward the lower surfaces of the sign, as opposed to FIGS. 7 and 8, which were viewed toward the upper surfaces. The next step in the method is to fold the arms 61 and 62 onto arm 60 along the hinges 72 extending from the apices A and B. As can be seen in FIG. 10, the result is that the folded hinges 71 will line up with the center hinge 73 of the arm 60. Although it cannot be seen in FIG. 10, the back side of the sign, i.e., the arm 60, in FIG. 10 has exposed colored band material. To protect this material, the whole sign is folded in half along center hinge 73, with the colored band material inside the fold. The final form of the folded sign is shown in FIG. 11.

Figure 12:
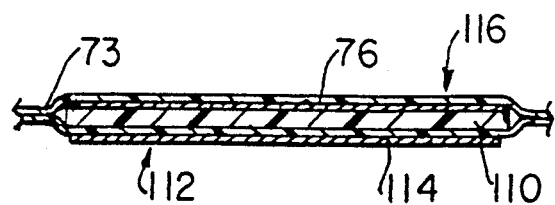
FIG. 12 a cross section taken along the line 12—12 of FIG. 6.

The embodiment of FIGS. 6-12, in its completely folded form, has only six overlapping layers. In the embodiment of FIGS. 1-4, the folded form could have as many as 16 layers. Thus, the embodiment of FIGS. 6-12 can use much thicker materials for the slats and the indicia than in the first, preferred embodiment. FIG. 12 shows a cross section of one of the slats 83, showing the thick core 110 of the slat. The overlying flexible tape 73 used for the hinges can also be seen.

The lower surface 112 of the slat 83 preferably has magnetic tape 114 for attachment to a vehicle, while the upper surface includes the colored bands 76. Because the core material 110 is relatively thick, it is contemplated that it could be formed to integrate a reflective surface on its upper surface 116, obviating the need for additional reflective material. This can be accomplished, for example, by injection molding the core 110 to have cube corner prismatic lenses formed on its upper surface 116 using a nickel insert in the mold, such as that produced by Astro Optics, Inc.

If the entire upper surface 116 of the core 110 is formed to be reflective, the other bands can be formed by adhering the colored tapes or sheets discussed above directly to the reflective surface 116, which would be covered in those areas. Additionally, similarly injection molded and thick strips could be added to a non-reflective core, since thickness is not a critical design limitation of the sign of the present invention.

While the embodiments of the invention shown and described are fully capable of achieving the results desired, it is to be understood that these embodiments have been shown and described for purposes of illustration only and not for purposes of limitation.

What is claimed is:

1. A contourable portable highway emergency sign for a vehicle, comprising
   a plurality of spaced apart slats arranged in at least two vertically aligned side-by-side rows, each of said slats having at least one horizontal edge and at least one vertical edge,
   at least one flexible horizontal hinge on at least one of the horizontal edges of each of said slats, said horizontal hinge connected to the horizontal edge of an adjacent slat and foldable along the horizontal axis,
   at least one flexible vertical hinge on at least one of the vertical edges of each of said slats, said vertical hinge connected to the vertical edge of an adjacent slat and foldable along a vertical axis,
   a plurality of said slats having a portion of a warning indicia on at least one surface thereof, said warning indicia being formed by said indicia portions arranged on said plurality of slats,
   means for attaching said sign to a surface of said vehicle, said means being located on at least one side of at least one of said slats,
   said slats, said vertical hinges and said horizontal hinges being arranged such that said sign may be folded concurrently about multiple axes, at least two of said axes being substantially perpendicular to one another and the flexibility of said horizontal and vertical hinges along said perpendicular axes causing said sign to generally conform to the contours of said surface.

2. A sign according to claim 1 wherein said slats are arranged in two columns.

3. A sign according to claim 2, wherein said slats are spaced from each other so as to allow wind to pass between said adjacent ones of said slats.

4. A sign according to claim 1 wherein said slats define the arms of a triangular shaped emergency sign.

5. A sign according to claim 1, wherein when said slats are folded onto each other, said warning indicia is between said slats and protected from damage.

6. A sign according to claim 1, wherein said connecting means are flexible hinges.

7. A sign according to claim 1, wherein said attachment means comprises at least one magnetic strip attached to one of said slats.

8. A contourable collapsible triangular highway emergency sign for attachment to a vehicle and comprising:
   first, second, and third side arms defining the triangular sign and each including at least two slats and flexible connecting means joining said slats together in each of said arms to allow said slats to be folded onto each other when the sign is not in use,
   flexible connecting means attaching said first arms to said second and third arms at two of the apices of the triangular sign,
   attaching means on said slats of said second and third arms for detachably joining said second and third arms together to define the third apex of the triangular sign, and
   means on the back surface of said rams for detachably attaching the triangular sign to a vehicle, the flexibility of said flexible connecting means causing said sign to conform to the contours of the surface of the vehicle;
   wherein said flexible connecting means comprise plastic tapes secured to the back surfaces of said slats.

9. A collapsible triangular highway emergency sign in accordance with claim 8 wherein said attaching means for detachably attaching the triangular sign to a vehicle comprises flexible magnetic strips.

10. A collapsible triangular highway emergency sign in accordance with claim 9 wherein said attaching means for joining said second and third arms at the third apex of the sign comprises magnetic means on the lower surface of one of said second and third arms and mating magnetic means on the upper surface of the other of said arms.

11. A collapsible triangular highway emergency sign in accordance with claim 10 wherein said side arms each comprise at least eight individual slats and wherein the mating magnets of said second and third side arms at the third apex of the sign each comprise multiple magnet elements corresponding in shape to their associated slats.

12. A contourable collapsible triangular highway emergency sign for attachment to a surface of a vehicle, said sign comprising
   a first arm, comprising a plurality of spaced apart first arm slats,
   a second arm comprising a plurality of spaced apart second arm slats, said second arm being permanently flexibly interconnected with said first arm at one end of said second arm and with a third arm at the other end of said second arm, and
   the third arm comprising a plurality of spaced apart third arm slats, said third arm being permanently flexibly interconnected with said second arm at one end of said third arm and removably connected to said first arm at the other end of said third arm to form a triangle,
   each of said arms comprising spaced apart triangular shaped slats, rectangular shaped slats and a plurality of quadrilateral slats, at least one of said quadrilateral slats in each of said arms comprising a trapezoid, and
   each of said rectangular slats having at least one straight edge generally perpendicular to a second edge of said slat,
   at least one flexible hinge on at least one of the straight edges of each of said rectangular slats, said hinge on said straight edge being connected to the straight edge of an adjacent slat and folding along a first axis, with at least one rectangular slat in each of said arms having a flexible hinge on two opposed straight edges of said rectangular slat, the majority of said slats having a light reflective material on at least one surface, at least one of said triangular slats in each arm having one hinges on each of at least two different edges of said triangular slat, and each of said trapezoidal slats having hinges on three of the four edges of said trapezoidal slat, means for attaching said sign to a surface of said vehicle, said means being located on at least one side of at least one of said slats, said slats and hinges being arranged such that said sign may be folded concurrently on said flexible hinges along multiple axes, with said triangle being collapsible by folding of said arms onto an adjacent one of said arms, and the flexibility of said hinges causing said sign to generally conform to the contours of said surface.

* * * * *